United States Patent Office.

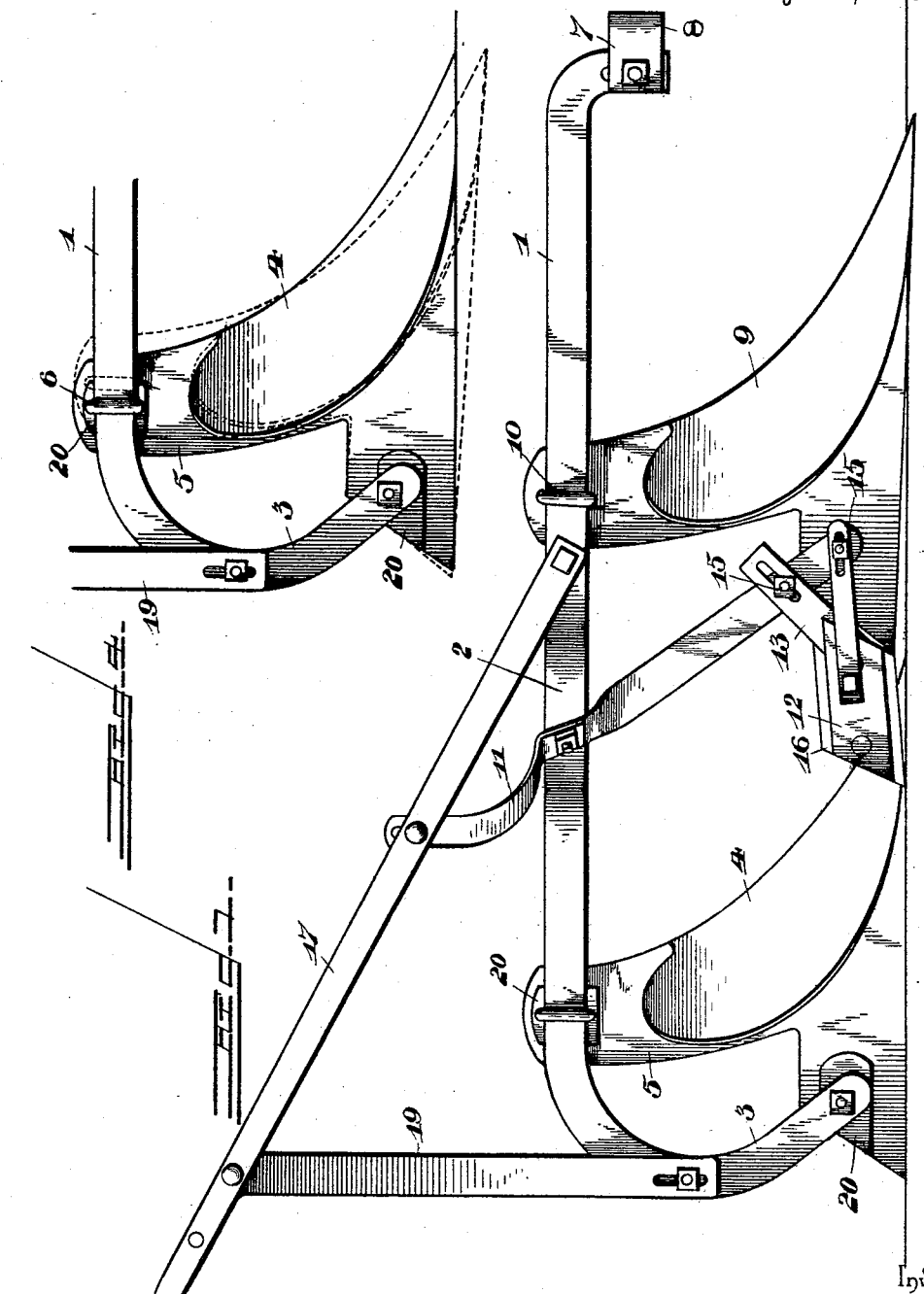

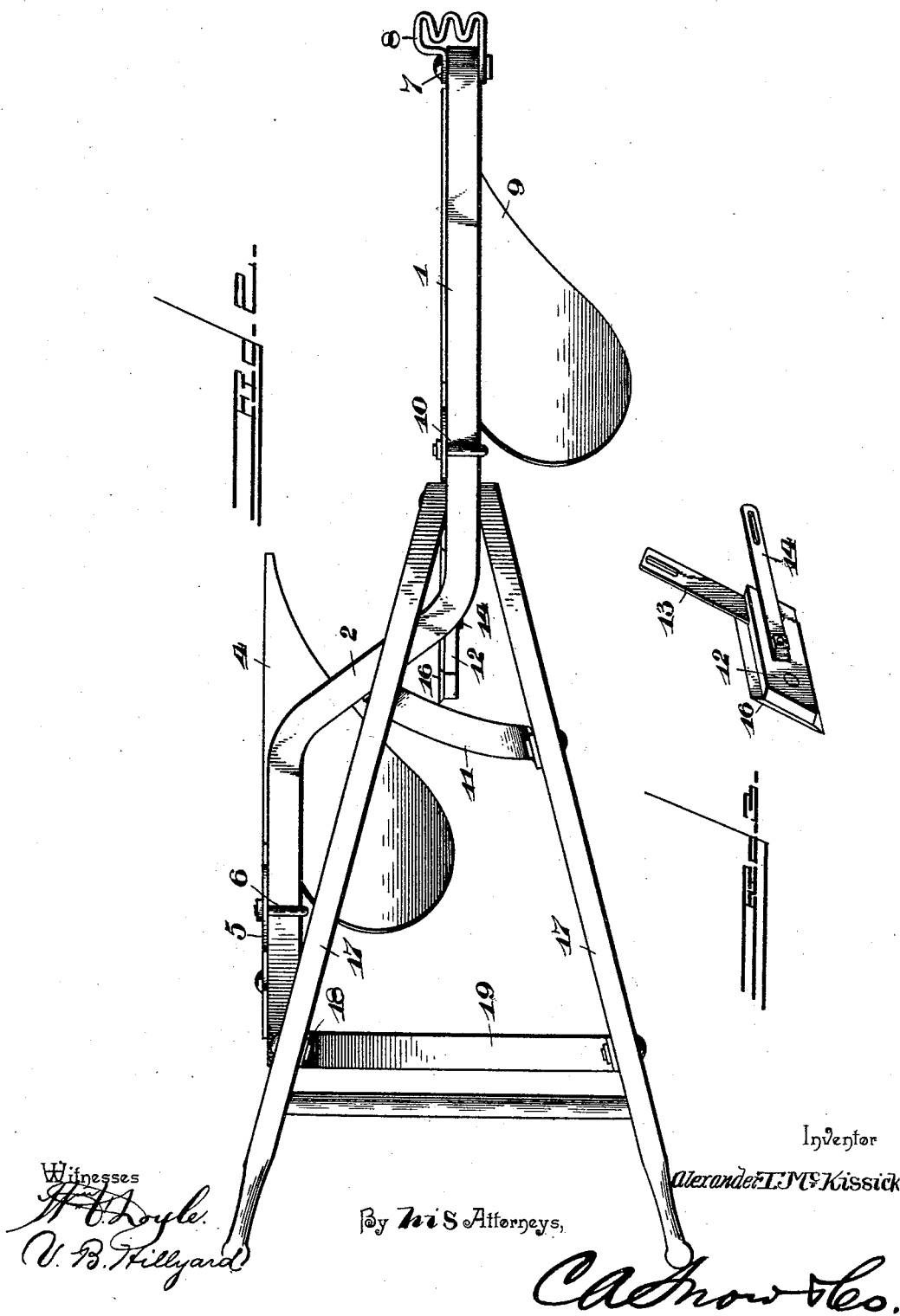

ALEXANDER T. McKISSICK, OF BLACKSTONE, VIRGINIA.

PLOW.

SPECIFICATION forming part of Letters Patent No. 583,189, dated May 25, 1897.

Application filed June 8, 1896. Serial No. 594,713. (No model.)

*To all whom it may concern:*

Be it known that I, ALEXANDER T. McKISSICK, a citizen of the United States, residing at Blackstone, in the county of Nottoway and State of Virginia, have invented a new and useful Plow, of which the following is a specification.

This invention relates to plows and aims to secure ease and positiveness in the adjustment of the shovels to plow deep or shallow or make furrows wide or narrow and to lessen the draft and prolong the life of the points.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a plow, showing the application of the invention. Fig. 2 is a top plan view thereof. Fig. 3 is a detail view of the attachment whereby the plows are caused to run deep or shallow. Fig. 4 is a detail view of the rear end of the beam, showing an adjusted position of the plow by dotted lines.

Corresponding and like parts are referred to in the following description and indicated in the several views of the accompanying drawings by the same reference-characters.

The beam 1 is of iron or steel and has an offset 2 about midway of its ends, so as to throw the end portions in different relative planes, and the rear end of the beam curves downwardly and forwardly, forming a standard 3, to which the rear shovel or plow 4 is pivotally connected at its rear end, thereby admitting of the front end of the plow being relatively adjusted, so as to give to the plow or shovel the requisite pitch. The stock 5 of the rear plow 4 has its upper end lapped alongside of the curved end of the beam and secured thereto by means of a clip 6, so that by loosening the clip the plow can be turned upon its pivotal connection with the standard 3, and the clip 6 will move upon the curved portion of the said standard 3, so as to admit of the pitch of the plow being varied, and when the desired adjustment is secured the plow is fastened and held rigidly in the located position by retightening the clip 6, as will be readily comprehended. The front end of the beam 1 is bent downwardly, as shown at 7, and is formed with a series of openings, and a clevis 8 is adjustably fitted to the bent end 7 and secured thereto by a pin or bolt passing through registering openings in the clevis and bent end 7. The clevis has a series of horizontally-disposed notches to admit of the draft being applied to the beam at any desired point, so as to throw the plows or shovels at a greater or less inclination to the line of draft.

A shovel or plow 9 is applied to the front portion of the beam in advance of the offset 2, and its stock is secured to the beam by a clip 10, similar in construction to the clip 6, and a brace 11 is interposed between the rear end of the plow 9 and the offset 2, so as to strengthen the plow and hold it to its work. The plow 9 is set in advance of the plow 4, and the attachment for regulating the depth of the furrow is arranged intermediate of the two plows and is applied to the front plow and is vertically adjustable, so as to attain the desired end.

The attachment comprises, essentially, a block or short bar 12, having its ends oppositely inclined to conform approximately to the inclined end of the landside of the plow. Bars 13 and 14 connect the part 12 with the front plow 9, the bar 13 inclining upwardly and forwardly and having adjustable connection with the brace 11, and the bar 14 having adjustable connection with the rear end of the plow 9. The front ends of these bars 13 and 14 are slotted and receive the bolts 15, by means of which they are adjustably connected with the respective parts to which they are attached. By a proper adjustment of the bars 13 and 14 the block or bar 12 can be moved up or down and toward the front or rear, as required, to secure the desired adjustment. The part 12 is, properly speaking, a gage shoe or runner, and its office is to slide upon the bottom of the furrow and thereby regulate the depth of plowing. A plate 16 is secured to one face of the shoe or runner and projects a short distance beyond the top and bottom edges thereof, so as to cut into the ground and cause the implement to run steady and overcome in part side draft. The construction of the shoe or runner is such as to admit of its being reversed when one side is worn, so that the opposite side may be brought into position to effect the desired result.

The handles 17 are secured to the beam in advance of the offset 2 and are supported by braces 18 and 19, which have adjustable connection, respectively, with the handles and the beam, thereby admitting of the rear ends of the handles being raised or lowered, as required. By adjusting the plows and attaching them to one side or the other of the beam 1 the furrow can be made wide or narrow, as desired.

A plate or block 20 is adapted to be interposed between the landside of a plow and its standard or the latter and the beam, so as to vary the width of the furrow cut by the combined action of the front and rear plows. When this block or filling-piece 20 is interposed between the rear plow and its standard or beam, the furrow is widened a distance corresponding to the thickness of the filling-piece, and when the latter is interposed between the front plow and its standard or beam the furrow will be proportionately narrower, corresponding to the thickness of the plate or block thus interposed. The operation of this filling-piece or block will be understood when it is remembered that the front and rear plows coöperate to cut a furrow. When the rear plow is moved outward, the furrow is widened, and when the front plow is moved inward the furrow is made narrower. Hence by placing the block or filling-piece in the manner described the width of the furrow cut by the combined action of the two plows can be varied.

Having thus described the invention, what is claimed as new is—

1. The combination with a plow, of a gage shoe or runner for regulating the depth of plowing, provided with oppositely-extending cutters and adapted to be reversed so as to bring a new surface and a new cutter into working position when the other surface is worn, substantially as set forth.

2. The combination with a plow, of a gage shoe or runner for regulating the depth of plowing; and a plate secured to the said shoe and projecting beyond the active face thereof to cut into the ground and cause the plow to run steady, substantially as specified.

3. The combination with a plow, of a gage shoe or runner, and bars adjustably connecting the said shoe or runner with the plow so as to admit of the shoe being moved vertically and longitudinally, substantially as described.

4. In combination, a beam having an offset intermediate of its ends, front and rear plows fitted to the end portions of the beam upon opposite sides of the said offset, and a gage shoe or runner located intermediate of the two plows and in line with the landside of the front plow, and adapted to be adjusted vertically to regulate the depth of plowing, substantially as set forth.

5. The herein-described plow, comprising a metallic beam having an offset intermediate of its ends, and having its rear portion curved to form a standard, and having its front end bent downwardly, a clevis adjustably fitted to the front end of the beam, front and rear plows secured to the beam upon opposite sides of the offset, handles adjustably connected with the beam so as to admit of their rear ends being raised and lowered, a gage shoe or runner adapted to be reversed and having adjustable connection with the front plow so as to regulate the depth of furrow, and a plate secured to one face of the shoe and projecting beyond the top and bottom edges thereof so as to enter the ground and cause the plow to run steady, substantially as set forth.

In testimony that I claim the foregoing as my own I have hereto affixed my signature in the presence of two witnesses.

ALEXANDER T. McKISSICK.

Witnesses:
J. W. JONES,
GEO. P. ADAMS.